United States Patent [19]

Takahashi et al.

[11] Patent Number: 4,936,908
[45] Date of Patent: Jun. 26, 1990

[54] METHOD FOR SMELTING AND REDUCING IRON ORES

[75] Inventors: Kenji Takahashi; Katsuhiro Iwasaki; Shigeru Inoue; Haruyoshi Tanabe; Masahiro Kawakami; Kenzo Yamada; Ichiro Kikuchi, all of Tokyo, Japan

[73] Assignee: NKK Corporation, Tokyo, Japan

[21] Appl. No.: 246,456

[22] Filed: Sep. 19, 1988

[30] Foreign Application Priority Data

| Sep. 25, 1987 | [JP] | Japan | 62-240183 |
| Oct. 15, 1987 | [JP] | Japan | 62-260603 |
| Oct. 15, 1987 | [JP] | Japan | 62-260604 |
| Oct. 15, 1987 | [JP] | Japan | 62-260606 |

[51] Int. Cl.$^5$ ............................................. C21B 11/00
[52] U.S. Cl. ...................................... 75/501; 75/502; 75/958
[58] Field of Search ............................ 75/38, 40, 59.25

[56] References Cited

U.S. PATENT DOCUMENTS

| 4,396,421 | 8/1983 | Stift et al. | 75/10.22 |
| 4,399,983 | 8/1983 | Metz | 266/225 |
| 4,409,023 | 10/1983 | Weber et al. | 75/38 |
| 4,430,116 | 2/1984 | Yamazaki et al. | 75/38 |
| 4,504,311 | 3/1985 | Weiner | 266/219 |

FOREIGN PATENT DOCUMENTS

| 58-144407 | 8/1983 | Japan | 75/38 |
| 145307 | 7/1985 | Japan | 75/38 |
| 61-43406 | 9/1986 | Japan | |
| 214116 | 9/1987 | Japan | 75/40 |

Primary Examiner—Melvyn J. Andrews
Attorney, Agent, or Firm—Frishauf, Holtz Goodman & Woodward

[57] ABSTRACT

A method for smelting and reducing iron ores comprises the steps of: the step of preheating and prereducing iron ores; the step of charging the preheated and prereduced iron ores into a smelting reduction furnace; the step of charging carbonaceous material and fluxing material into the smelting reduction furnace; the step of blowing in oxygen gas into the smelting reduction furnace through a top-blow oxygen lance having decarbonizing nozzles and post combustion nozzles; and the step of blowing in stirring gas through side and bottom tuyeres set respectively in a side wall and a bottom of the smelting reduction furnace. Furthermore, an apparatus for smelting reduction fitted for the method comprising: a preheat and prereduction furnace preheating and prereducing iron ores; a smelting reduction furnace into which iron ores, carbonaceous material and fluxing material are charged and in which the iron ores are smelted and reduced; a top-blow oxygen lance through which oxygen gas is blown in into the smelting reduction furnace, having decarbonizing nozzles and post combustion nozzles; and the smelting reduction furnace having bottom and side tuyeres built respectively in a side wall and a bottom thereof.

16 Claims, 6 Drawing Sheets

METHOD FOR SMELTING AND REDUCING IRON ORES

BACKGROUND OF THE INVENTION

1. Field of the Invention

The present invention relates to a method for smelting and reducing iron ores and an apparatus therefor, and more particularly to a method for charging and blowing in a smelting reduction process and an apparatus with a constitution suitable for the method.

2. Description of the Prior Art

Smelting reduction method is to be substituted for a blast furnace iron making method and has recently been under research and development to overcome a disadvantages in that the blast furnace iron making method requires not only an expensive construction cost but also a vast construction site.

It is well known that in this smelting reduction method, prereduced iron ores or iron ores, as material, are charged and furthermore carbonaceous material, as fuel and reducing agent, and fluxing material such as lime stone are charged onto a molten metal contained in a smelting reduction furnace, while oxygen is blown in the smelting reduction furnace. Thus, the carbonaceous material is melted into molten metal and C contained in the carbonaceous material is oxidated. CO gas generating from the molten metal are post-combusted into $CO_2$ gas by means of $O_2$ gas excessively blown in. Sensible heat of this $CO_2$ gas is transferred to slag covering the face of the molten metal and to iron grains suspended in the slag and then to the molten metal. In this way, heat necessary for reduction of iron ores are transferred to the iron ores to be reduced and the molten metal is efficiently produced.

However, when in order to reduce the weight of reduction of iron ores, prereduction ratio of the iron ores before transference thereof to the smelting reduction furnace, exhaust gas circulated from the smelting reduction furnace to a prereduction furnace is required to be low-oxidated gas and be of a large amount. For this reason, the combustion ratio of CO in the smelting reduction furnace is lowered and as a result, this prior art smelting reduction method is disadvantageous in that the heat efficiency ratio of the smelting reduction furnace is lowered.

SUMMARY OF THE INVENTION

In the light of the mentioned difficulty, it is an object of the present invention to provide a method for smelting reduction and an apparatus therefor wherein the heat efficiency ratio is improved in a smelting reduction furnace to promote smelting reduction without raising a prereduction ratio of iron ores in a prereduction furnace.

To attain the object, in accordance with the present invention, a method is provided for smelting and reducing iron ores which comprises the steps of:
 the step of molten metal carbonaceous material and fluxing material into a smelting reduction furnace; preheating and prereducing iron ores; charging the preheated and prereduced iron ores into the smelting reduction furnace;
 the step of blowing oxygen gas into the smelting reduction furnace through an oxygen lance disposed in the top of the smelting reduction furnace and having decarbonizing nozzles and post combustion nozzles; and
 the step of blowing in stirring gas through side tuyeres built in a side wall of a smelting reduction furnace and through bottom tuyeres built in a bottom of the smelting reduction furnace.

Furthermore, in accordance with the present invention, an apparatus for smelting reduction fitted for the method comprising:
 a preheat and prereduction furnace preheating and prereducing iron ores;
 a smelting reduction furnace into which iron ores, carbonaceous material and fluxing material are charged and in which the iron ores are smelted and reduced;
 a top-blow oxygen lance through which oxygen gas is blow in into the smelting reduction furnace, having decarbonizing nozzles and post combustion nozzles; and
 the smelting reduction furnace having bottom tuyeres built respectively in a side wall and a bottom of the smelting reduction furnace.

The object and other objects and advantages of the present invention will become clear from the detailed description to follow, taken in conjunction with the appended drawings.

DESCRIPTION OF THE PREFERRED EMBODIMENT

Figure 1:
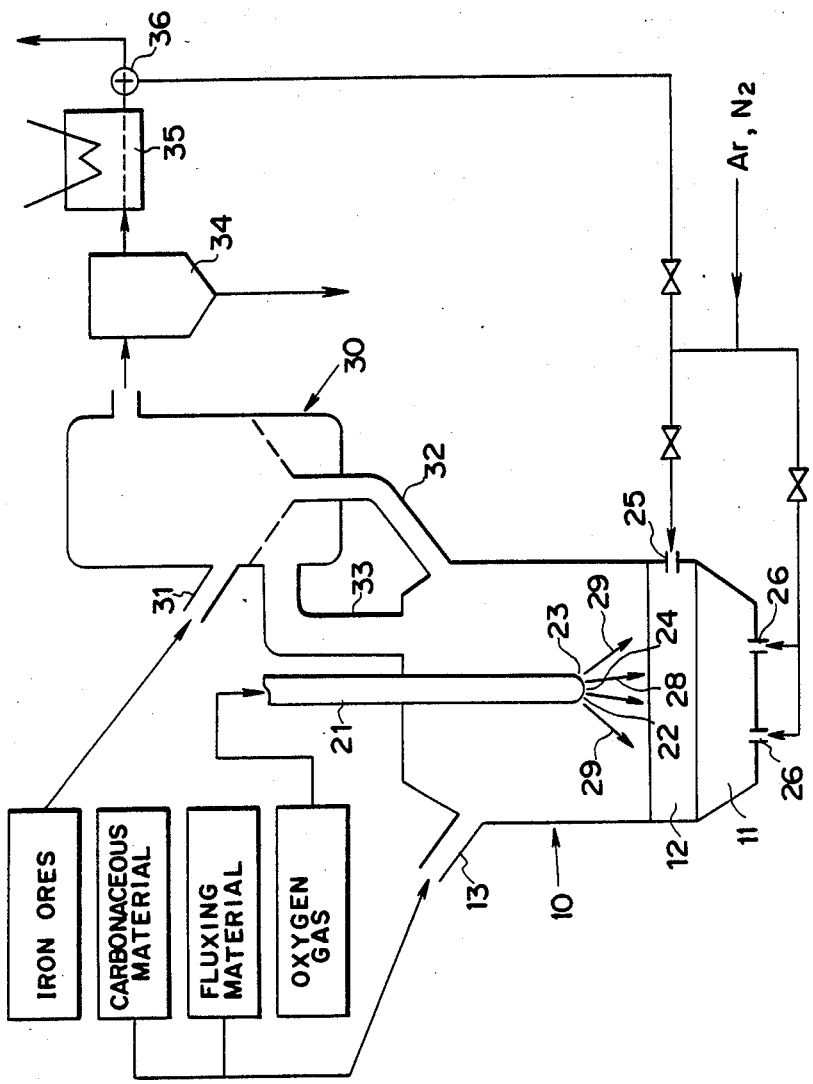
FIG. 1 is a block diagram illustrating an embodiment of an apparatus for the method of the present invention.

Now referring specifically to the drawings, a preferred embodiment of the present invention will be described. FIG. 1 of the drawing shows a block diagram of an embodiment of an apparatus used for a method for smelting and reducing iron ores according to the present invention. In a smelting reduction furnace 10, molten metal bath 11 and slag layer 12 are formed, first shoot 13 through which lime stone and flux is set in an upper portion of the smelting reduction furnace and oxygen lance 21 through which oxygen gas is blown in is vertically inserted down into the smelting reduction furnace.

Figure 2:
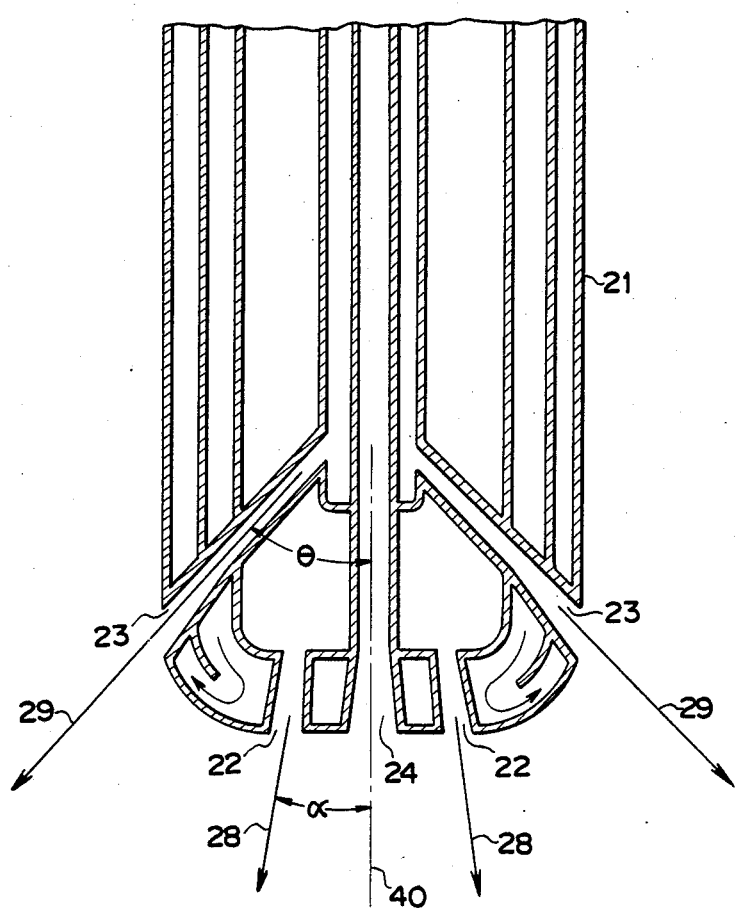
FIG. 2 is a view illustrating an enlarged tip of an oxygen lance of a smelting reduction furnace included in the apparatus for the method of the present invention.

FIG. 2 of the drawing illustrates an enlarged vertical section view of the tip end portion of oxygen lance 21 used for an embodiment of a method for smelting and reducing iron ores according to the present invention. As seen from FIG. 2, decarbonizing nozzles 22 and post combustion nozzles 23 are arranged in the oxygen lance 21 so as to supply oxygen gas independently through the decarbonizing nozzles and the post combustion nozzles from individual oxygen supply sources set outside the smelting reduction furnace by means of controlling a pressure and a flow amount respectively.

Furthermore, center nozzle 24 for supplying mainly carbonaceous material, lime stone or the like other than iron ores is arranged, passing through the center tip of the oxygen lance. The center nozzle can be replaced by the decarbonizing nozzles, thereby to introduce the carbonaceous material and the lime stone or the like together with the oxygen gas, depending on capacity and operational condition of the furnace 11. Arrow symbols 28 and 29 at the tip of oxygen lance 21, each, show directions of injecting out oxygen gas respectively through the decarbonizing nozzles and the post combustion nozzles. Chain line 40 is the center axis of the oxygen lance.

Above said smelting reduction furnace 10, there is provided preheat and prereduction furnace 30, which is a fluid bed type reaction vessel, having second sheet 31 and third sheet 32. Through the second shoot 31, iron ores are charged into the preheat and prereduction furnace and through the third shoot leading from the preheat and prereduction furnace to the smelting reduction furnace the iron ores preheated and prereduced are transferred and charged into the smelting reduction furnace.

In addition, leading pipe 33 connects smelting reduction furnace 10 to preheat and prereduction furnace 30, exhaust gas generated from the smelting reduction furnace is transferred to the preheat and prereduction furnace. From the view point of material, equipment cost, smooth operation and so forth, as the preheat and prereduction furnace, a shaft furnace type vessel with a good heat efficiency or a rotary kiln type vessel useful for cost reduction and easy operation can be employed without any difficulty in carrying out the present invention.

Furthermore, hot cyclone 34 for removing dust from exhaust gas generating from preheat and prereduction furnace 30 and steam generator 35 for obtaining steam by making use of sensible heat of the exhaust gas, each, are set, connected with the preheat and prereduction furnace as shown in FIG. 1. On the other hand, side tuyeres 25 and bottom tuyeres 26 through which stirring gas is respectively blown in are built in a side wall and a bottom of smelting reduction furnace 10, each. Furthermore, gas selector valve 38 is set, which controls transfer direction of the exhaust gas coming out of steam generator so as to send the exhaust gas to side tuyeres 25 and bottom tuyeres 26 or to exhaust the same to the outside of the system. It should be noted that the steam generator can be alternated to preheat iron ores, using the exhaust gas generating from the preheat and prereduced furnace.

Now, a preferred embodiment of a method of the present invention, using an apparatus constituted as above mentioned will be described.

Before iron ores are charged into a smelting reduction furnace, so called seed molten metal is already charged therein in ordinary operation to make the operation start up smoothly and quickly. When the seed molten metal is not in the smelting reduction furnace, iron scraps are melted to prepare the seed molten metal.

At the start up of the operation, no slag exists. Slag such as at least one selected from the group consisting of basic oxygen furnace slag, smelting reduction furnace slag, blast furnace slag and electric furnace slag is charged together with carbonaceous material and the slag is melted with combustion of the carbonaceous material by oxygen. Iron ores do not begin to be charged until an amount of slag reaches 30 kg per 1 ton molten metal bath in the smelting reduction furnace. If the amount is less than 30 kg, the slag does not work satisfactorily as a solvent, while if the amount is over 100 kg, the effect of the slag, as a solvent, hits the ceiling. Charging amount of carbonaceous material and blowing amount of oxygen gas are increased in proportion to charging amount of iron ores. But, unless the start-up slagging is completed, heat efficiency is insufficient or temperature of molten metal does not rise promptly. As a result, abnormal operation such as melting loss of a furnace wall or slopping occurs.

Fluxing material is normally charged in the form of bulky lumps or rough grains into smelting reduction furnace 10. However, in case that it is necessary to shorten a time of melting the fluxing material, it is effective that the powdered fluxing material is blown in together with carrier gas through oxygen nozzle 21 or side tuyeres 25 and bottom tuyeres 26. 80 kg/T. molten metal, basic oxygen furnace slag was blown in through tuyeres 26 by using Ar or $N_2$ inert gas, as carrier gas. On the other hand, in comparison, as the normal method, 60 kg/T. molten metal lime stone and 20 kg/T. molten metal silica were charged through first shoot 13. As to the time period from the start of blowing up to the start of charging the iron ores, the method using carrier gas required 14 minutes, while the normal method required 20 minutes.

After molten slag is thus formed, iron ores, as material of molten metal, is charged into smelting reduction furnace 10, and the smelting reduction of the iron ores are started. Normal and basic operational conditions such as production amount of molten metal, charging amount of iron ores, blowing amount of oxygen gas are shown in Table 1. An operation example described hereinbelow was carried out on the same conditions as those shown or the like.

TABLE 1

| Smelting Reduction Furnace | | Preheat and prereduction Furnace | |
|---|---|---|---|
| Molten Metal | 27.3 (t/Hr) | Iron Ores | 40.1 (t/Hr) |
| Iron Ores | 40.1 (t/Hr) | Preheat temp. | 800 (°C.) |
| Silica | 18 (t/Hr) | Prereduction Ratio | 15% |
| Limestone | 3 (t/Hr) | | |
| Oxygen Gas Decarbonization | 6650 ($Nm^3$/Hr) | | |
| Post combustion | 6650 ($Nm^3$/Hr) | | |
| Temp. of Molten Metal | 1510 (°C.) | | |
| [C] | 4.8% | | |

Iron ores, carbonaceous material and lime stone which have been charged onto molten metal bath 11 and slag layer 12 through first shoot 13 are amply stirred by stirring gas which has been blown in through side tuyeres 25 and bottom tuyeres 26, thereby the reduction reaction being promoted. The stirring gas used for the stirring is process gas which is exhaust gas from steam generator 35, $N_2$ and/or Ar and is made use of properly, depending on operation conditions and material gas.

If a flow amount of stirring gas is excessive, the stirring gas is blown out through the surface of slag layer 12 to make blow-out gas channeling and the affect of the stirring is lost, or at least cannot be expected. Preferable range of the flow amount of the stirring gas blown in through side tuyeres 25 is 0.3 to 2 $Nm^3$/min /T. molten metal and the preferable range of the flow amount of the stiring gas through each of bottom tuyeres 26 is 0.5 to 3 $Nm^3$/T. molten metal bath.

Figure 3:
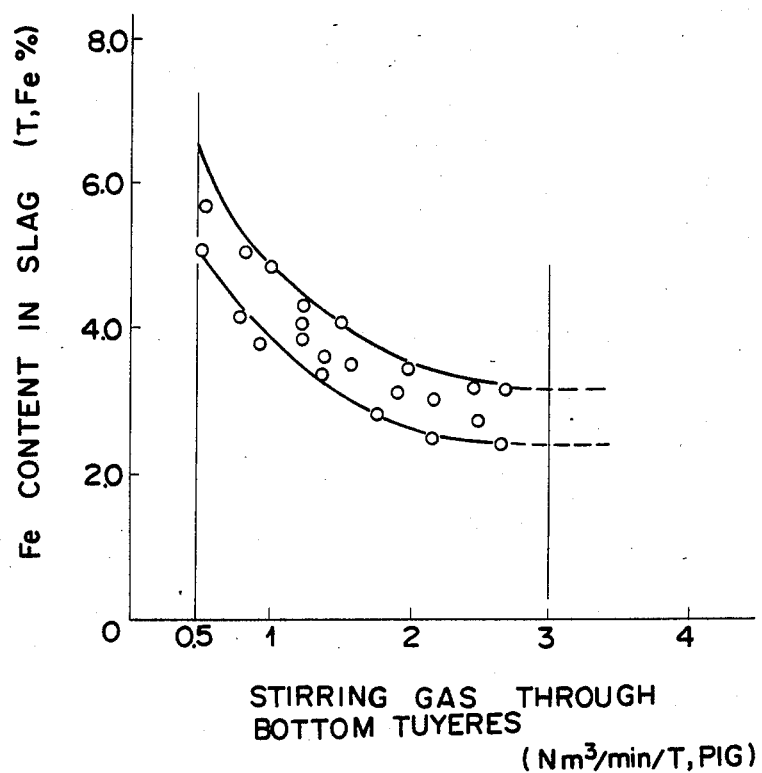
FIG. 3 is a graphic representation showing a relation between Fe content in slag (T, Fe) and flow amount of stirring gas blown in through bottom tuyeres built in a bottom of the smelting reduction furnace according to the present invention.

Now with specific reference to FIG. 3, a typical example of the blow-in of the stirring gas will be described. FIG. 3 shows graphically a relation between Fe content in slag (T,Fe) and amount of stirring gas blown in through bottom tuyeres 26. The Fe content in slag affects a yield of molten metal to be produced and in this respect, it is clear that the less the Fe content in slag is, the better the yield is. This graphic representation gives a case that the flow amount of the stirring gas blown in through side tuyeres 25 is constantly set as 1.0 $Nm^3$/min /T. molten metal bath. The amount of the Fe content in slag shows the lowest value, when the blowing amount of the stirring gas is 3.0 $Nm^3$/min./T. molten metal bath, and the effect of the reduction hits the ceiling even if the flow amount is raised more than 3.0 $Nm^3$/min./T. molten metal bath. On the other hand, if the flow amount is less than 0.5 $Nm^3$/min./T. molten metal bath, there is possibility that slopping will occur due to high slag iron content. Consequently, the flow amount of the stirring gas blown in through tuyeres 26 ranges preferably 0.5 to 3.0 $Nm^3$/min./T. molten metal. 2 to 3 $Nm^3$/min./T. molten metal is more preferable.

Figure 4:
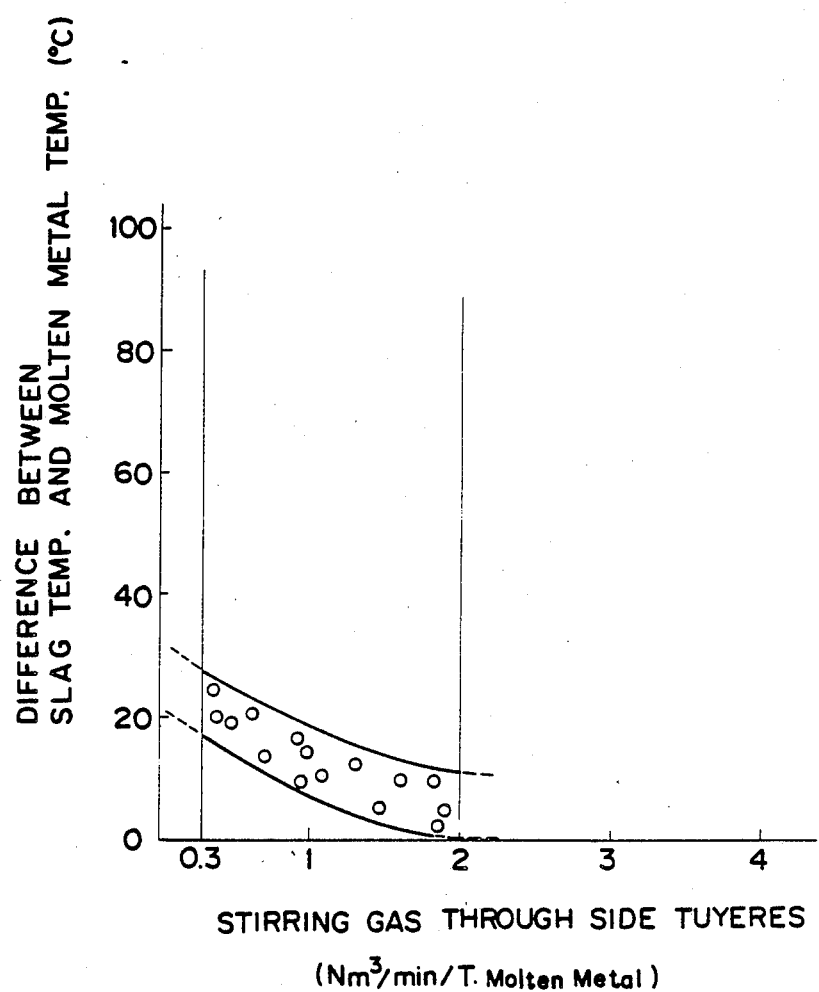
FIG. 4 is a graphic representation showing a relation of a difference between temperatures of slag and molten metal with flow amount of stirring gas blown in through side tuyeres built in a side wall of the smelting reduction furnace according to the present invention.

FIG. 4 shows graphically a relation of temperature difference between molten slag and molten metal in the smelting reduction furnace with blow amount of stirring gas through side tuyeres 25. The temperature difference indicates a degree of stirring molten metal bath 11 and slag layer 12. The small difference means that the stirring is amply performed. In other words, it is shown that the heat transfer efficiency to the molten metal is high and consequently, the heat efficiency is good. The graph gives a case that the flow amount of stirring gas through bottom tuyeres 26 is constantly set as 1.8/min./T. molten metal bath. The mentioned temperature difference shows the lowest when the flow amount of the stirring gas is 2.0 $Nm^3$/min./T. molten metal bath. Even if the flow amount of the stirring gas is increased more than 2.0 $Nm^3$/min./T. molten metal bath, the effect of reducing the temperature balance hits the ceiling. On the contrary, if the flow amount is less than 0.3 $Nm^3$/min /T. molten metal bath, the temperature difference is excessive to allow. Consequently, the flow amount of the stirring gas through the side tuyeres ranges preferably 0.3 to 2.0 $Nm^3$/min /T. molten metal.

Furthermore, the temperature difference is 40° to 60° C. in case that side tuyeres 25 are not built in the side wall of the smelting reduction furnace. As shown in FIG. 4, if the stirring gas is blown in through side tuyeres 25, the temperature difference is 30° C. or less, and the effect of the stirring is remarkable.

Oxygen gas blown in through decarbonizing nozzles 22 oxidates the carbonaceous material to supply heat enough to reduce iron ores. In addition, oxygen gas is blown in through post combustion nozzles 23, and this oxygen gas is mainly consumed for burning CO gas generated from carbonaceous material by means of oxidation in molten metal bath 11 and slag layer 12.

In FIG. 2, chain line 40 indicates the center axis of oxygen lance 21. An injection angle of $\alpha$ of decarbonizing nozzles 22 is determined as 15° or less, based on the conventional BOF oxygen lance, where $\alpha$ is an angle formed by chain line 40 and arrow 28 which is the center axis of decarbonizing nozzles 22 and shows a blowing direction. However, an injection angle of $\theta$ of combustion nozzles 23 has an important role of improving the heat efficiency of the smelting reduction furnace, where $\theta$ is an angle formed by chain line 40 and arrow 29 which is the center axis of post combustion nozzles 23 and shows a blowing direction. A preferable range of this injection angle is determined, based on a relation between the slope angle and the oxidation degree of the exhaust gas generated from the smelting reduction furnace. The relation is graphically represented in FIG. 5. The degree of the oxidation (OD) is given by the following equation:

$$OD=(CO_2+H_2O)/(CO+CO_2+H_2+H_2O)$$

Figure 5:
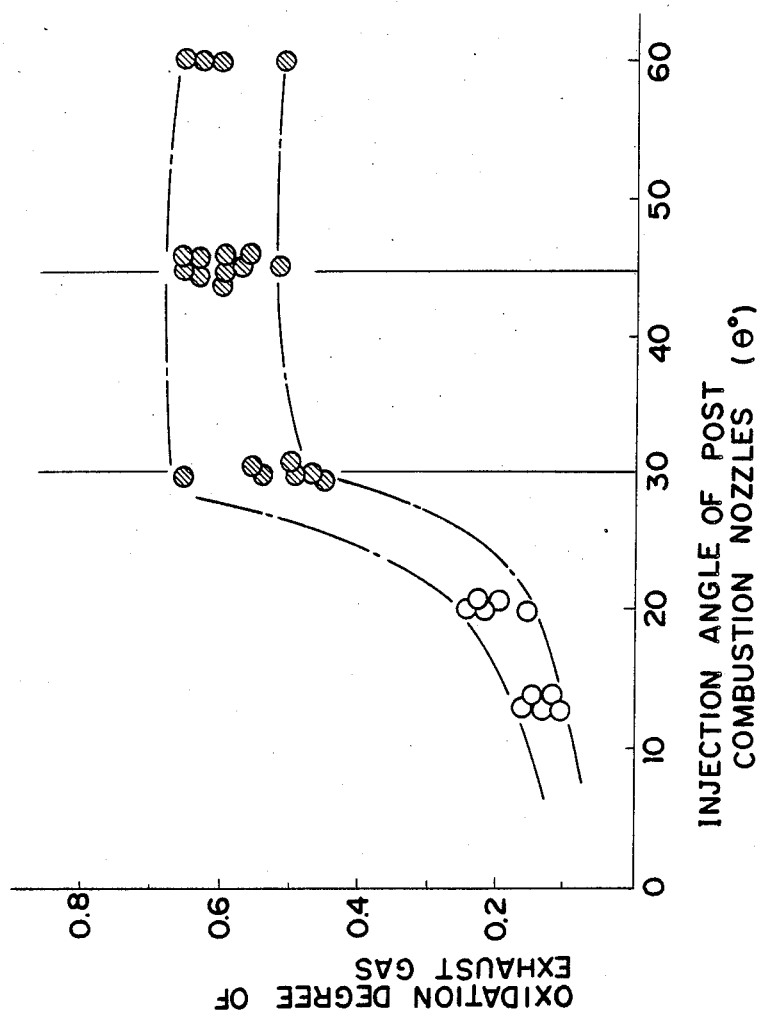
FIG. 5 is a graphic representation showing a relation between an oxidation degree of exhaust gas generating from the smelting reduction furnace and an injection angle for a post combustion nozzle according to the present invention.

As seen from FIG. 5, if the injection angle of $\theta$ is less than 30°, $CO_2$ produced by post combustion becomes easy to be reduced by C contained in ferrous grains splashed from molten metal bath 11 or C of carbonaceous material and the OD represented by the equation decreases remarkably. Consequently, the post combustion efficiency i.e. the heat efficiency of the smelting reduction furnace is lowered. Furthermore, if the injection angle of $\theta$ is over 45°, melting loss of the inner wall of the smelting reduction furnace caused by oxygen gas coming out of the post combustion is remarkably increased. As this result, the preferable range of the injection angle of $\theta$ is 30° to 45°.

As described in the foregoing, oxygen gas is blown in by means of the post combustion nozzles. However, if the basicity of slag is not appropriate, the operation is disturbed. With specific reference to FIG. 6, the preferable range of the basicity will be described.

Figure 6:
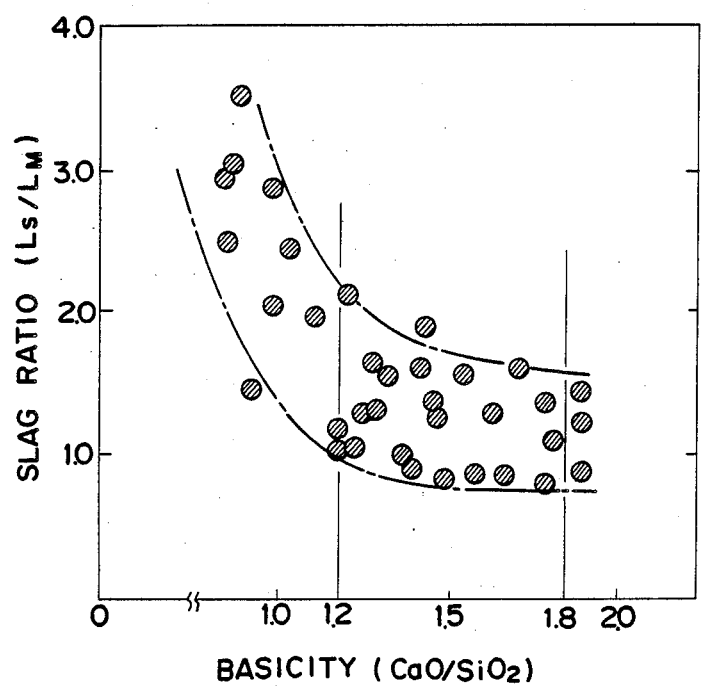
FIG. 6 is a graphic representation showing a relation between a slag ratio and basicity of slag according to the present invention.

FIG. 6 shows a relation between a slag ratio and basicity of slag. The slag ratio is represented by $L_S/L_M$. On the Y axis, $L_S$ represents thickness of slag layer 12 and $L_M$ represents depth of molten metal bath 11. The drop of the basicity of slag is caused mainly because $SiO_2$ contained in coal which is charged into the smelting reduction furnace is melted into slag when the smelting reduction reaction proceeds in the smelting reduction furnace. As seen from FIG. 6, slag if the basicity goes down less than 1.2, slag foaming increases and this causes slopping. Slopping gives unfavorable influence to the operation of the smelting reduction operation greatly. In order to reduce this phenomenon, fluxing material containing a large amount of CaO such as lime stone, burnt dolomite or basic oxygen furnace slag granule is added to slag to increase the basicity of the slag. On the other hand, if the basicity is over 1.8, Fe content in slag increases and this results in causing a drop of yield of the molten metal. As mentioned, the basicity can be reduced by $SiO_2$ contained in coal. In addition, in order to reduce the basicity quickly, powder coal is blown in through nozzle 24 of oxygen lance 21 or side tuyeres 25 and/or bottom tuyeres 26. Addition of fluxing material raising the basicity is carried out similarly. Ordinarily the fluxing material is supplied through first shoot 13. To control the basicity quickly, powder fluxing material is blown in through nozzle 24 of oxygen lance 21 or side tuyeres 25 and/or bottom tuyeres 26.

What is claimed is:

1. A method for smelting and reducing iron ores comprising the steps of:
   charging carbonaceous material and fluxing material into a smelting reduction furnace containing molten metal;
   preheating and prereducing iron ores by contacting iron ores with process gas from a smelting reducing furnace;
   charging the preheated and prereduced iron ores into the smelting reduction furnace;
   blowing oxygen gas into the smelting reduction furnace through an oxygen lance disposed in the top of the smelting reduction furnace and having decarbonizing nozzles and post combustion nozzles; and
   blowing in gas through side tuyeres disposed in a side wall of the smelting reduction furnace at a flow rate of 0.3 to 2.0 $Nm^3$/min./T. molten metal and bottom tuyeres disposed in a bottom of the smelting reduction furnace at a flow rate of 0.5 to 3.0 $Nm^3$/min./T. molten metal, to stir the molten metal.

2. The method of claim 1, wherein the angle of injection of the decarbonizing nozzles is 15° or less from the vertical axis and the angle of injection of the post combustion nozzles is 30° to 45° from the vertical axis.

3. The method of claim 1, which further comprises the step of charging fluxing materials and carbonaceous materials at an initial stage of blowing to melt the fluxing materials by combustion heat of the carbonaceous materials, the fluxing materials being charged at a flow rate of 30 to 100 kg/T. molten metal bath.

4. The method of claim 3, wherein the fluxing material is selected from the group consisting of basic oxygen furnace slag, smelting reduction furnace slag, blast furnace slag and electric furnace slag.

5. The method of claim 1, wherein fluxing material is charged through at least one selected from the group consisting of the oxygen lance, the bottom tuyeres and the side tuyeres.

6. The method of claim 1, wherein the stirring gas is at least one selected from the group consisting of $N_2$, Ar and process gas.

7. The method of claim 1, wherein the basicity of slag is adjusted to from 1.2 to 1.8 by charge of said fluxing material.

8. The method of claim 7, wherein the fluxing material is at least one selected from the group consisting of lime stone, burnt solomite and basic oxygen furnace slag granules.

9. The method of claim 1, which further comprises the additional step of removing dust from, exhaust gas which is generated during said preheating and prereducing step.

10. The method of claim 1, which further comprises the additional step of making steam by making use of sensible heat of exhaust gas which is generated from said preheating and prereducing step.

11. The method of claim 1, wherein said decarbonizing nozzles are positioned at the tip of the oxygen lance and said post combustion nozzles are positioned at an outer location relative to the position of said decarbonizing nozzles.

12. The method of claim 16, wherein said oxygen lance has a longitudinal central axis and said decarbonizing nozzles provide and angle of injection of 15° or less and said post-combustion nozzles provide an injection angle of from 30° to 45° relative to said axis.

13. A method for smelting and reducing iron ores comprising the steps of:
   charging carbonaceous material and fluxing material into a smelting reduction furnace containing molten metal while maintaining the basicity at from 1.2 to 1.8;
   preheating and prereducing iron ores with process gas from the smelting reduction furnace;
   charging the preheated and prereduced iron ores into the smelting reduction furnace;
   blowing oxygen gas into the smelting reduction furnace through an oxygen lance disposed in the top of the smelting reduction furnace and having decarbonizing nozzles and post combustion nozzles wherein the angle of injection of the decarbonizing nozzles is 15° less from the vertical axis and the angle of injection of the post combustion nozzles is 30° to 45° from the vertical axis; and
   blowing in gas through side tuyeres disposed in a side wall of the smelting reduction furnace at a flow rate of 0.3 to 2.0 $Nm^3$/min./T. molten metal and bottom tuyeres disposed in a bottom of the smelting reduction furnace at a flow rate of 0.5 to 3.0 $Nm^3$/min./T. molten metal, to stir the molten metal.

14. The method of claim 13, wherein the carbonaceous materials and fluxing material are initially charged at a rate of 30 to 100 kg/T molten metal.

15. The method of claim 14, wherein the stirring gas is at least one selected from the group consisting of $N_2$, Ar and smelting reduction process gas.

16. The method of claim 15, wherein the fluxing material is selected from the group consisting of limestone, burnt dolomite and basic oxygen furnace slag granules.

* * * * *